(12) United States Patent
Riou

(10) Patent No.: US 8,397,042 B2
(45) Date of Patent: Mar. 12, 2013

(54) SECURE MEMORY INTERFACE

(75) Inventor: Sebastien Riou, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1096 days.

(21) Appl. No.: 12/319,788

(22) Filed: Jan. 12, 2009

(65) Prior Publication Data

US 2010/0082927 A1    Apr. 1, 2010

(30) Foreign Application Priority Data

Oct. 1, 2008    (KR) .................. 10-2008-0096574

(51) Int. Cl.
  *G06F 12/00*    (2006.01)
(52) U.S. Cl. .................. 711/163; 711/154; 711/E12.093
(58) Field of Classification Search .................. None
  See application file for complete search history.

(56) References Cited

U.S. PATENT DOCUMENTS

| | | | | |
|---|---|---|---|---|
| 5,978,953 | A * | 11/1999 | Olarig | 714/768 |
| 6,842,386 | B2 | 1/2005 | Suzuki | 365/200 |
| 2007/0204199 | A1* | 8/2007 | Chung et al. | 714/763 |
| 2009/0049364 | A1* | 2/2009 | Jo et al. | 714/763 |

OTHER PUBLICATIONS

WIPO Publication No. WO 2006/085251 to Bosch, having Publication date of Aug. 17, 2006 (w/ English Abstract page).
WIPO Publication No. WO 2006/120310 to Wuidart et al., having Publication date of Nov. 16, 2006 (w/ English Abstract page).
Korean Patent Publication No. 1990-0002329 to Kim et al., having Publication date of Feb. 28, 1990 (w/ English Abstract page).
Korean Patent Publication No. 1999-024450 to Yoo, having Publication date of Apr. 6, 1999 (w/ English Abstract page).
Japanese Patent Publication No. 09-259532 to Masaki et al., having Publication date of Oct. 3, 1997 (w/ English Abstract page).

\* cited by examiner

*Primary Examiner* — Charles Rones
*Assistant Examiner* — John P Fishburn
(74) *Attorney, Agent, or Firm* — Monica H. Choi

(57) ABSTRACT

A secure memory interface includes a reader block, a writer block, and a mode selector for detecting fault injection into a memory device when a secure mode is activated. The mode selector activates or deactivates the secure mode using memory access information from a data processing unit. Thus, the data processing unit flexibly specifies the amount and location of the secure data stored into the memory device.

25 Claims, 14 Drawing Sheets

| Register Flag State | Source/Destination Memory Address Type | Access Mode |
|---|---|---|
| 0 | Regular Space | Regular |
| 0 | Secure Space | Secure |
| 1 | Regular Space | Secure |
| 1 | Secure Space | Secure |

771 → (row 1), 772 → (row 2), 773 → (row 3), 774 → (row 4)

*FIG. 12*

| Data Type Size (Register_Width) 902 | Regular Size in Memory 904 | Secure Size in Memory 906 | Size Increase Factor 908 | Security Level 910 |
|---|---|---|---|---|
| 8 | 8 | 16 | 2 | Very Strong |
| 16 | 16 | 32 | 2 | Very Strong |
| 24 | 32 | 32 | 1 | Strong |

*FIG. 13*

| | Inputs to Encoder | | |
|---|---|---|---|
| Activated CPU Data Width Signal | E | Rh | Rl |
| 8 bits | X | X | Data |
| 16 bits | 0x00 | Data MSB | Data LSB |
| 24 bits | Data MSB | Data Middle Byte | Data LSB |

*FIG. 16A*

| | Output from Encoder | |
|---|---|---|
| Activated CPU Data Width Signal | EDC_out_H | EDC_out_L |
| 8 bits | Undefined | EDC8 |
| 16 bits | EDC16H | EDC16L |
| 24 bits | EDC24 | Undefined |

*FIG. 16B*

SECURE MEMORY INTERFACE

CROSS-REFERENCE TO RELATED APPLICATION(S)

The present application claims priority under 35 U.S.C. §119 to Korean Patent Application No. 2008-0096574, filed on Oct. 1, 2008, which is incorporated herein by reference in its entirety.

TECHNICAL FIELD

The present invention relates generally to electronic systems with a memory device and a data processing unit, and more particularly, to flexible control of secure or regular access to the memory device by the data processing unit.

BACKGROUND OF THE INVENTION

Memory devices are prone to fault injection attacks such as by use of lasers or X-rays. For example, lasers and X-rays allow for precise attacks by modifying states of bits in the memory device. The laser is especially suitable for injecting faults in registers, RAM (random access memory) devices, EEP (electrically erasable and programmable) memory devices, and flash memory devices. Such fault injection may be permanent or temporary.

In addition, such fault injection attacks may be used to reveal secret keys or output memory content. Detection of such fault injection into the memory device is desired for preventing misuse of information stored in the memory device.

In the prior art, a laser detector may be used to detect for a laser source. However, the laser detector is not adapted to detect for laser attacks on memory devices.

Alternatively in the prior art, memory devices are adapted to include storage of error detection code. In that case, the memory device detects for fault injection attacks within the memory device. However, implementation of such error detection code within the memory devices increases the silicon area of the memory device. In addition, if the states of the bits are modified on a bus outside of the memory device, the error detection code may not detect such fault injection outside of the memory device.

Also in the prior art, the memory device may include hardware redundancy with redundant data storage for detection of fault injection within the memory device. However, such storage redundancy results in duplication of silicon area resulting in especially large silicon area for memory devices with high capacity. In addition, data verification with storage redundancy may result in slower operation of the memory device.

Alternatively in the prior art, a data processing unit such a CPU (central processing unit) accessing the memory device includes software for verifying data integrity. However, such software which is also stored in a memory device is subject to fault injection. In addition, code size and execution time for the software of the CPU is increased with such additional data verification functionality.

Thus, an efficient mechanism for detection of fault injection within the memory device and outside of the memory device such as in the bus to/from the memory device is desired.

SUMMARY OF THE INVENTION

Accordingly in a general aspect of the present invention, a secure memory interface operates for automatic detection of such fault injection.

A secure memory interface according to an aspect of the present invention includes a reader block and a mode selector. The reader block generates a final read data to be transferred to a data processing unit by separating away error detection code from initial read data transferred by a memory device when a secure mode is activated. The mode selector activates or deactivates the secure mode using memory access information from the data processing unit.

In an embodiment of the present invention, the reader block generates the final read data from the initial read data without separating any error detection code when the secure mode is deactivated.

In one example embodiment of the present invention, the memory access information includes an instruction name. In that case, the mode selector includes an instruction decoder that activates the secure mode when the instruction name is for a secure read instruction, and that deactivates the secure mode when the instruction name is for a regular read instruction.

In a further embodiment of the present invention, the reader block and the instruction decoder are disposed in the data processing unit that is a CPU (central processing unit).

In an alternative embodiment of the present invention, the memory access information includes an address of the memory device to be accessed for the initial read data. In that case, the mode selector includes an address decoder that activates the secure mode when the address of the memory device to be accessed is a secure address and that deactivates the secure mode when the address of the memory device to be accessed is a non-secure address.

In an example embodiment of the present invention, the address decoder is disposed outside of the data processing unit that is a CPU (central processing unit) for generating the address of the memory device to be accessed.

In another embodiment of the present invention, the memory access information includes a register name. In that case, the mode selector includes a respective register flag that indicates whether the register name corresponds to activation or deactivation of the secure mode.

In an example embodiment of the present invention, the reader block and the respective register flag are disposed in the data processing unit that is a CPU (central processing unit).

In a further embodiment of the present invention, the reader block includes a demixer, an encoder, and a comparator. The demixer generates the final read data by separating away the error detection code from the initial read data when the secure mode is activated, and generates the final read data from the initial read data without separating any error detection code when the secure mode is deactivated.

The encoder generates an expected error detection code from at least one of a corresponding address and the final read data. The comparator generates an error detection signal by comparing the error detection code separated from the initial read data with the expected error detection code.

In another embodiment of the present invention, the reader block further includes a state machine and a width selector. The state machine reads the initial read data from the memory device by generating a memory address and a read enable signal from the memory access information. The width selector controls the state machine to read the initial read data with a memory data width depending on at least one data width control signal that also controls operation of the encoder and the demixer.

In an example embodiment of the present invention, the memory data width corresponds to the memory device, and the at least one data width control signal corresponds to a processing data width of the data processing unit.

In an embodiment of the present invention, the data processing unit is a CPU separated from the memory device by a bus. The data processing unit and the memory device are fabricated as one integrated circuit chip. Alternatively, the data processing unit and the memory device are fabricated as two separate integrated circuit chips.

In another embodiment of the present invention, the secure memory interface further includes a writer block that generates a final write data to be written to the memory device from initial write data and error detection code when the secure mode is activated. The writer block generates the final write data from the initial write data without the error detection code when the secure mode is deactivated.

In an aspect of the present invention, the writer block and the reader block are implemented with hardware logic gates within the CPU.

When the memory access information includes an instruction name, the instruction decoder activates the secure mode when the instruction name is for a secure write instruction, and deactivates the secure mode when the instruction name is for a regular write instruction.

In a further embodiment of the present invention, the writer block includes an encoder and a mixer. The encoder generates the error detection code from at least one of a corresponding address and the initial write data. The mixer generates mixed write data from the initial write data and the error detection code when the secure mode is activated and from the initial write data without the error detection code when the secure mode is deactivated. The mixed write data determines the final write data.

In another embodiment of the present invention, the writer block further includes a state machine and a width selector. The state machine generates the final write data, a write enable signal, and a memory address of the memory device for storing the final write data, from the mixed data. The width selector controls the state machine to generate the final write data with a memory data width depending on the at least one data width control signal that controls the encoder and the mixer.

An electronic system according to another aspect of the present invention includes a memory device, a data processing unit, and an interface unit. The data processing unit generates memory access information including at least one address bit or a register name that specifies a type of access to the memory device. The interface unit accesses the memory device according to the type of access as specified by the memory access information. For example, the type of access includes a secure access or a non-secure access. The at least one address bit generated by the data processing unit determines the type of access to the memory device. Alternatively, the register name generated by the data processing unit determines the type of access to the memory device.

In this manner, the CPU flexibly specifies the amount and location of the data stored into the memory device with secure access. Fault injection is detected for such data as specified by the CPU using the reader and writer blocks implemented in hardware in the CPU. Thus, increase in silicon area for such reader and writer blocks is insignificant for the memory device of any capacity. In addition, fault injection within the memory device or at the bus between the memory device and the CPU is effectively detected.

These and other features and advantages of the present invention will be better understood by considering the following detailed description of the invention which is presented with the attached drawings.

BRIEF DESCRIPTION OF THE DRAWINGS

FIG. 12 shows a table illustrating activation or deactivation of the secure mode when both a flag register and an address decoder are used for the mode selector, according to an embodiment of the present invention;

FIG. 13 shows a table of data widths for the CPU and the memory device with activation and deactivation of the secure mode, according to an embodiment of the present invention;

FIG. 16A shows a table of inputs to the encoder of FIG. 5, according to an example embodiment of the present invention; and FIG. 16B shows a table of outputs from the encoder of FIG. 5, according to an example embodiment of the present invention.

The figures referred to herein are drawn for clarity of illustration and are not necessarily drawn to scale. Elements having the same reference number in FIGS. 1, 2, 3, 4, 5, 6, 7, 8, 9, 10, 11, 12, 13, 14, 15, 16A, and 16B refer to elements having similar structure and/or function, unless stated otherwise.

DETAILED DESCRIPTION

Figure 1:
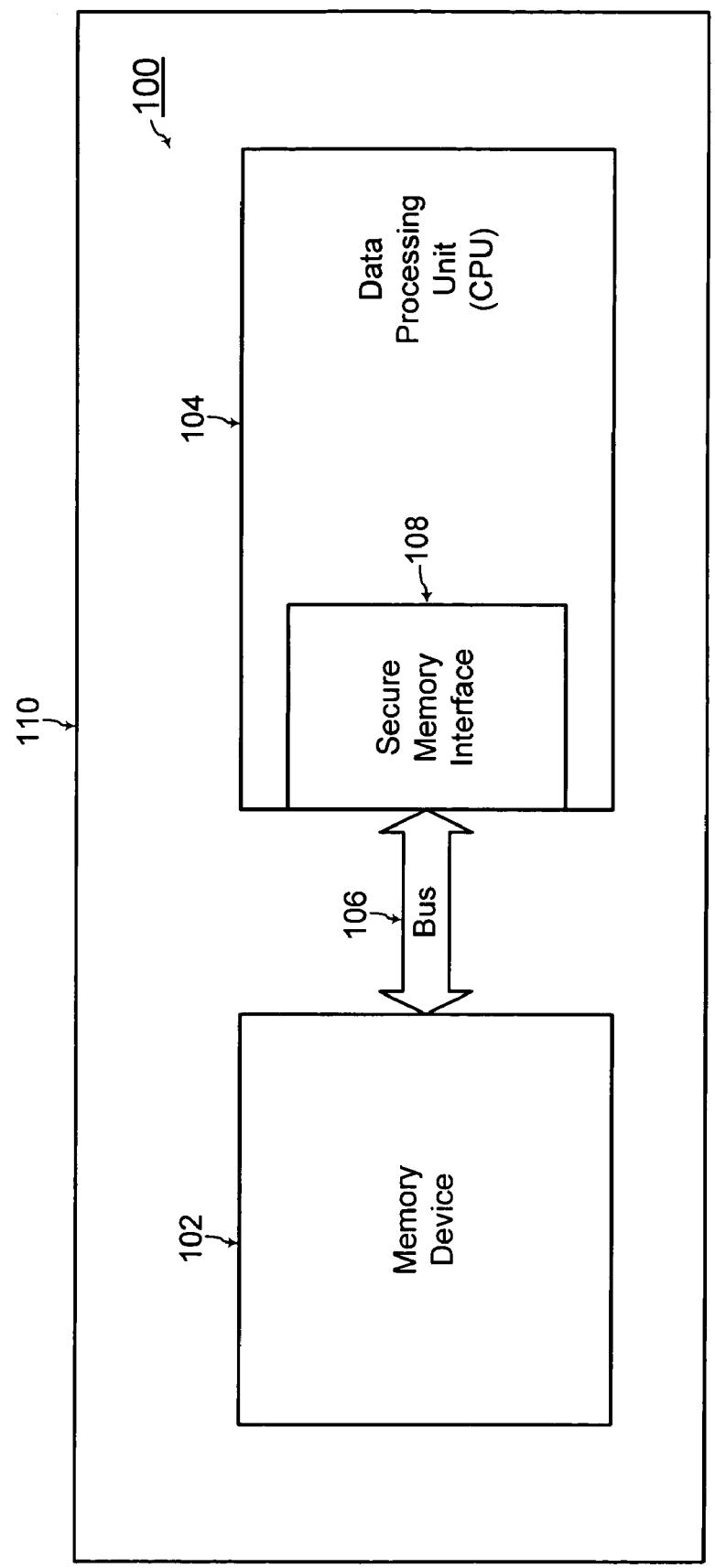
FIG. 1 shows a block-diagram of an electronic system with a secure memory interface, according to an embodiment of the present invention.

FIG. 1 shows a block diagram of an electronic system 100 having a memory device 102, a data processing unit 104, and a bus 106. The electronic system 100 may be formed as components of a smart card 110 in an example embodiment of the present invention. However, the present invention is not limited thereto, and the present invention may be practiced with the electronic system 100 being in other applications. The present invention may be practiced with the memory device 102 and the data processing unit 104 being fabricated as one integrated circuit chip, or being fabricated as two separate integrated circuit chips.

The memory device 102 and the data processing unit 104 exchange signals via the bus 106. The data processing unit 104 is a CPU (central processing unit) with a secure memory interface 108 (i.e., an interface unit) in an example embodiment of the present invention.

Figure 2:
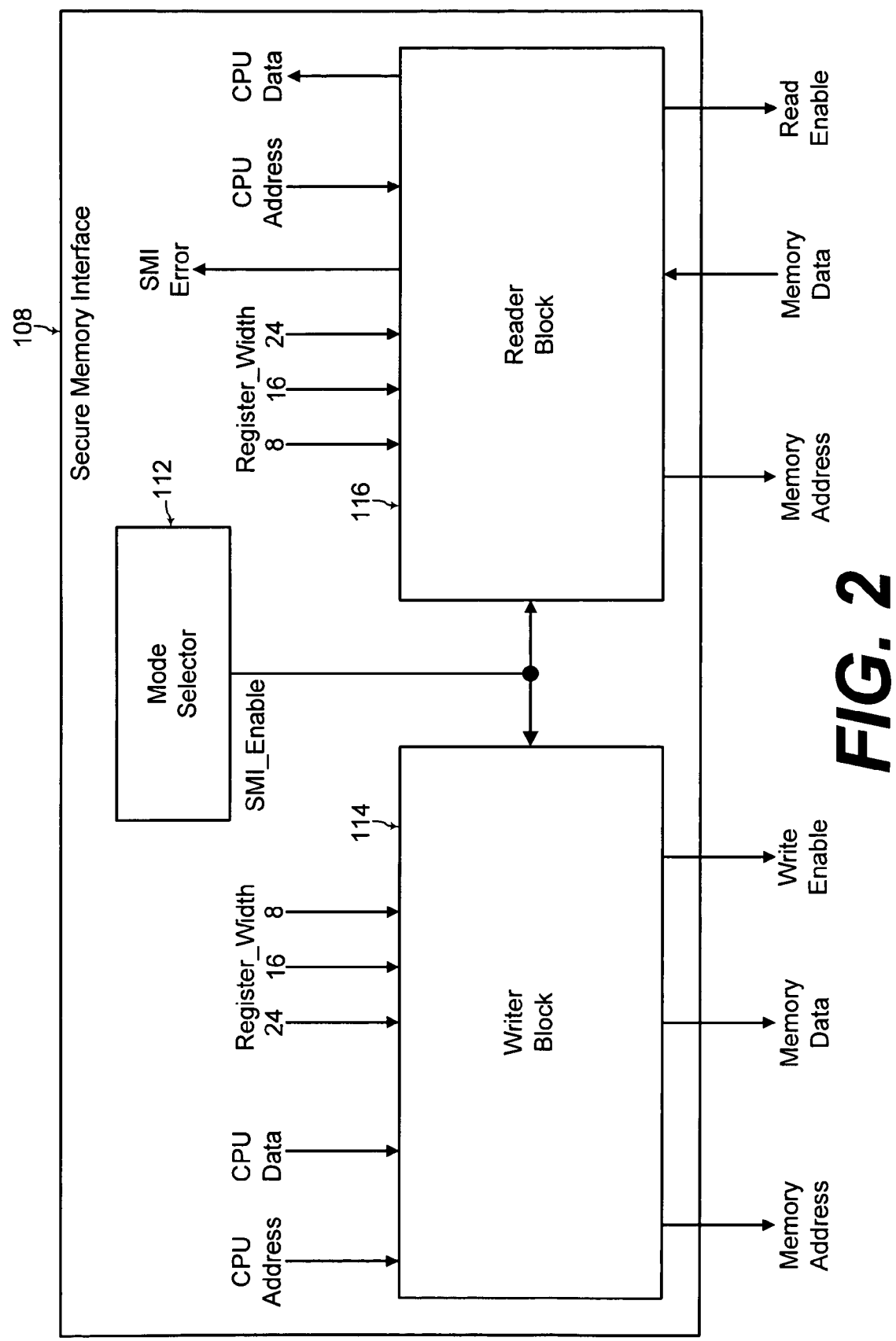
FIG. 2 shows a block diagram of the secure memory interface of FIG. 1, according to an embodiment of the present invention.

Referring to FIGS. 1 and 2, the secure memory interface 108 includes a mode selector 112, a writer block 114, and a reader block 116. The writer block 114 receives an address (CPU address) and data (CPU data) from the CPU 104 for writing such data into the specified address of the memory device 102. The reader block 116 receives an address (CPU address) from the CPU 104 for reading data from the specified address of the memory device 102.

The mode selector 112 actives or deactivates a secure mode of operation for the writer block 114 and the reader block 116. The writer block 114 and the reader block 116 operate in a secure mode or a non-secure mode depending on activation or deactivation, respectively, of the secure mode by the mode selector 112. The mode selector 112 generates a secure mode enable signal SMI_Enable for indicating activation or deactivation of the secure mode.

Figure 3:
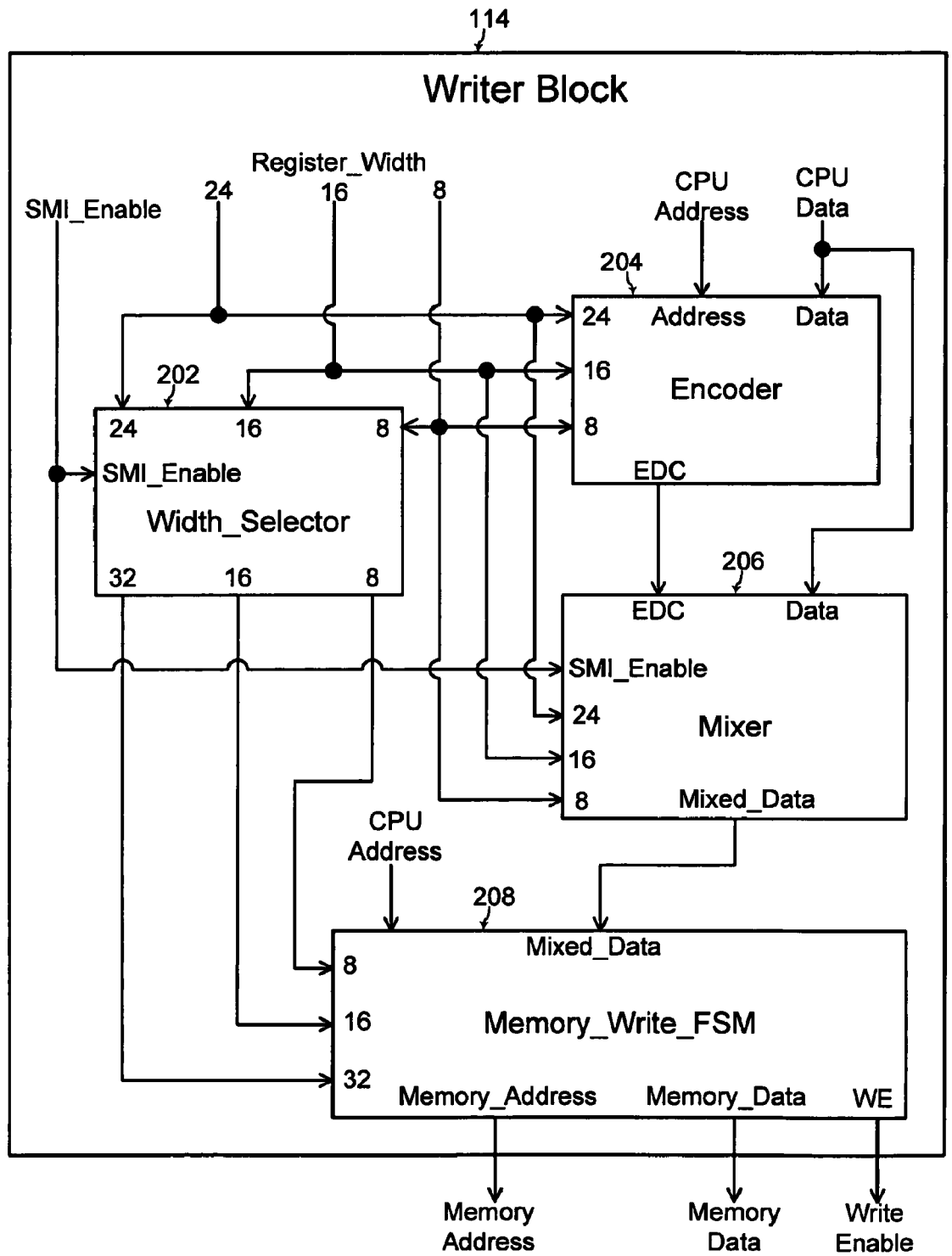
FIG. 3 shows a block diagram of a writer block in the secure memory interface of FIG. 2, according to an embodiment of the present invention.

FIG. 3 shows a block diagram of the writer block 114 of FIG. 2, according to an example embodiment of the present invention. The writer block 114 includes a width selector 202, an encoder 204, a mixer 206, and a memory write FSM (finite state machine) 208.

Referring to FIGS. 1, 2, and 3, the CPU 104 activates one of the Register_Width signals "24", "16", and "8" to indicate the number of bits (i.e., CPU data width or more generally a processing data width) processed by the CPU 104 with the memory device 102. For example, the CPU 104 generates 8-bits, 16-bits, or 24-bits of data to the memory device 102 at a time, or receives 8-bits, 16-bits, or 24-bits of data at a time from the memory device 102.

FIG. 13 shows a table of data bits occupied in the memory device 102 depending on the CPU data width. The first column 902 lists the typical example CPU data width such as 8-bits, 16-bits, or 24-bits. The second column 904 lists the corresponding number of bits stored in the memory device 102 for each of the CPU data widths 8-bits, 16-bits, and 24-bits when the secure mode is not activated. The third column 906 lists the corresponding number of bits stored in the memory device 102 for each of the CPU data widths 8-bits, 16-bits, and 24-bits when the secure mode is activated.

When the secure mode is not activated, the 8-bits of data from the CPU 104 are stored as 8-bits in the memory device 102. Similarly when the secure mode is not activated, the 16-bits of data from the CPU 104 are stored as 16-bits in the memory device 102. Also when the secure mode is not activated, the 24-bits of data from the CPU 104 are stored as 32-bits in the memory device 102, with the additional 8-bits being set to predetermined bits.

When the secure mode is activated, the 8-bits of data from the CPU 104 are stored as 16-bits in the memory device 102, with the additional 8-bits being generated with an error detection code. Similarly when the secure mode is activated, the 16-bits of data from the CPU 104 are stored as 32-bits in the memory device 102, with the additional 16-bits being gener-ated with an error detection code. Also when the secure mode is activated, the 24-bits of data from the CPU 104 are stored as 32-bits in the memory device 102, with the additional 8-bits being generated with an error detection code.

A fourth column 908 of the table of FIG. 13 states the increase in the multiple (i.e., size increase factor) of bits stored in the memory device 102 (i.e., memory data width) to the number of bits generated from the CPU 104 (i.e., CPU data width) for the secure mode being activated from the secure mode being deactivated. The multiple of the number of bits stored in the memory device 102 to the number of bits generated from the CPU 104 is increased two-times when the CPU data width is 8-bits or 16-bits with the secure mode being activated. The multiple of the number of bits stored in the memory device 102 to the number of bits generated from the CPU 104 remains "1" when the CPU data width is 24-bits even with the secure mode being activated.

The fifth column 910 of the table of FIG. 13 indicates the level of security achieved with activation of the secure mode for the example 8-bits, 16-bits, and 24-bits of the CPU data widths. The level of security (i.e., the ability to detect fault injection) achieved for the 8-bits or 16-bits of the CPU data width is very strong because the number of bits is increased two-times after incorporating the error detection code for storage into the memory device 102. The level of security achieved for the 24-bits of the CPU data width is strong but less strong than the 8-bits or the 16-bits because the number of bits is increased less than two-times for the 24-bits after incorporating the error detection code for storage into the memory device 102.

Figure 4:
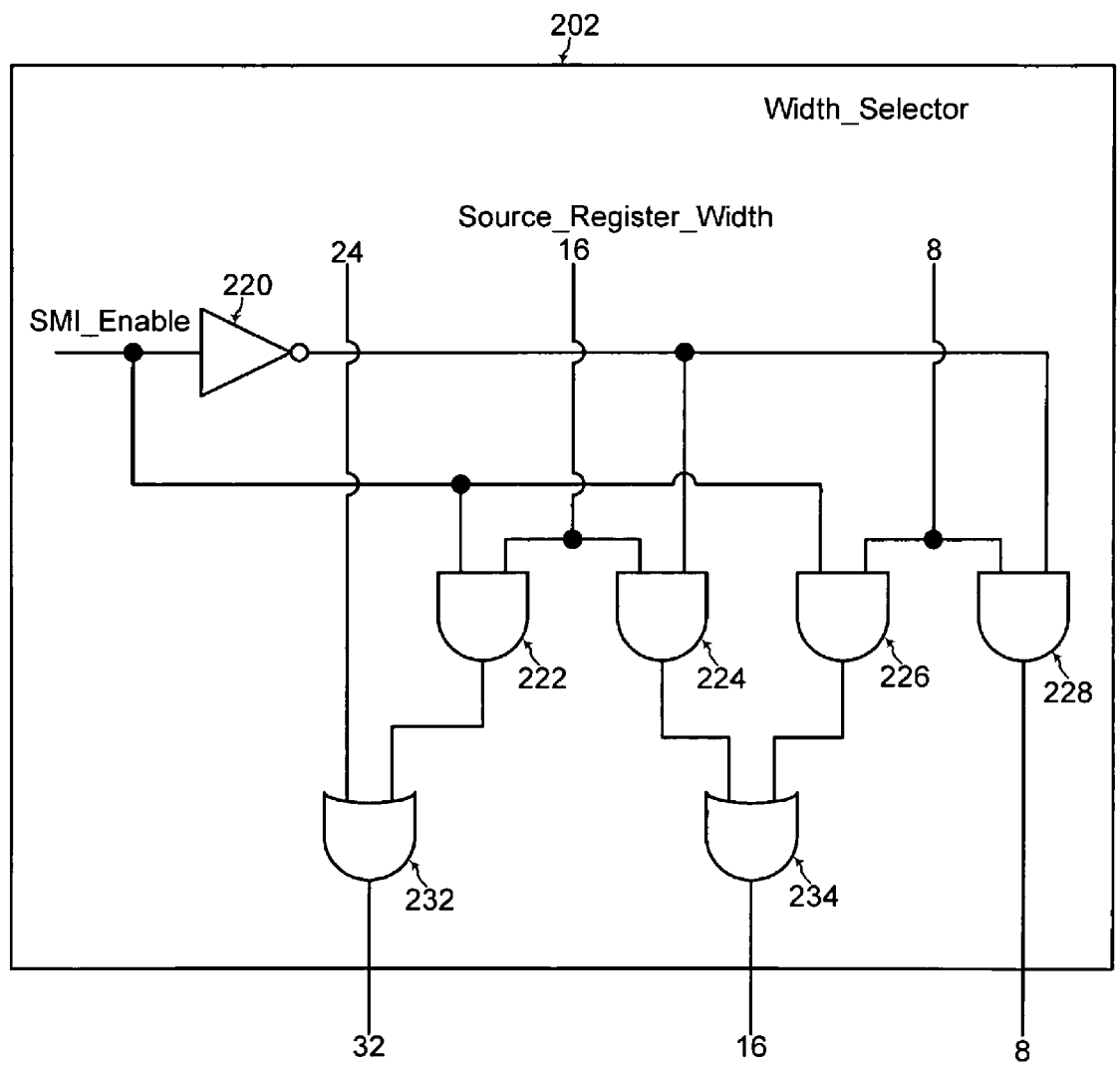
FIG. 4 shows a circuit diagram of a width selector in the writer block of FIG. 3, according to an embodiment of the present invention.

Referring to FIGS. 3 and 13, the width selector 202 activates one of the memory data width signals "8", "16", and "32" for controlling the memory write FSM 208 to generate the memory data as 8-bits, 16-bits, or 32-bits. FIG. 4 shows a circuit diagram of the example width selector 202 that activates one of the memory data width signals "8", "16", and "32" depending on which one of the CPU data width signals "8", "16", and "24" is activated and depending on whether the secure mode enable signal (SMI_Enable) is activated.

Referring to FIG. 4, the width selector 202 includes an inverter 220 and first, second, third, and fourth AND-gates 222, 224, 226, and 228, respectively. The width selector 202 also includes first and second OR-gates 232 and 234, respectively. The secure mode enable signal (SMI_Enable) is input by the inverter 220 and the AND-gates 222 and 226. The "24" CPU data width signal is input by the OR-gate 232, the "16" CPU data width signal is input by the AND-gates 222 and 224, and the "8" CPU data width signal is input by the AND-gates 226 and 228.

The inverter 220, the AND-gates 222, 224, 226, and 228, and the OR-gates 232 and 234 are connected as illustrated in FIG. 4 such that the OR-gate 232 outputs the "32" memory data width signal, the OR-gate 234 outputs the "16" memory data width signal, and the AND-gate 228 outputs the "8" memory data width signal. Referring to FIGS. 4 and 13, one of the "8", "16", and "32" memory data width signals is activated when a corresponding one of the "8", "16", and "24" CPU data width signals is activated and when the secure mode is not activated, as illustrated in the first and second columns 902 and 904 in FIG. 13.

Alternatively, one of the "16" and "32" memory data width signals is activated when a corresponding one of the "8", "16", and "24" CPU data width signals is activated and when the secure mode is activated, as illustrated in the first and third columns 902 and 906 in FIG. 13. Referring to FIG. 3, the "8", "16", and "32" memory data width signals are received by the memory write FSM 208 to generate the memory data as 8-bits, 16-bits, or 36-bits depending on which one of the "8", "16", and "32" memory data width signals is activated.

Figure 5:
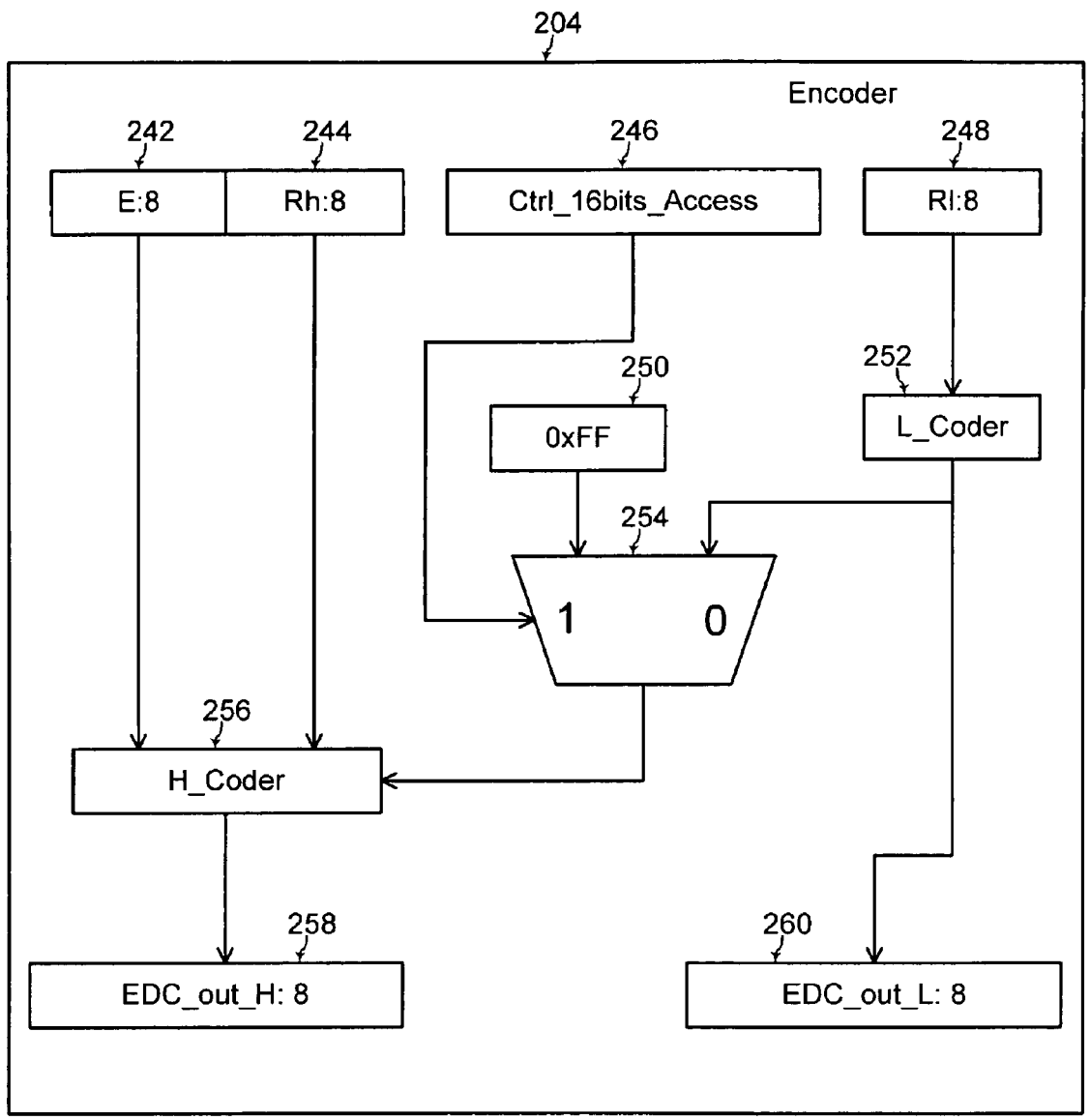
FIG. 5 shows a block diagram of an encoder for generating error detection code in the writer block of FIG. 3, according to an embodiment of the present invention.

FIG. 5 shows a block diagram of the encoder 204 for generating the error detection code (EDC) to be used when the secure mode is activated. The example encoder 204 of FIG. 5 uses the CPU data generated by the CPU 104 for generating the error detection code. However, the present invention may also be practiced with an encoder that generates the error detection code from both the CPU data and the CPU address generated by the CPU 104. In that case, the secure mode interface 110 would detect for fault injection into both the data and the address information.

FIG. 16A shows a table of inputs to the encoder 204 of FIG. 5 for activation of each of the CPU data width signals "8", "16", and "24", according to an example embodiment of the present invention. FIG. 16B shows a table of outputs from the encoder 204 of FIG. 5 for activation of each of the CPU data width signals "8", "16", and "24", according to an example embodiment of the present invention.

Referring to the example of FIG. 5 the encoder 204 includes an "E" 8-bits input signal 242, a "Rh" 8-bits input signal 244, and a "Rl" 8-bits input signal 248. In addition, the encoder 204 includes an "EDC_out_H" 8-bits output signal 258 and an "EDC_out_L" 8-bits output signal 260.

Referring to the example of FIGS. 5, 16A, and 16B, when the CPU data width is 8-bits, the "R1" input signal 248 includes the CPU data while the "E" and "Rh" input signals 242 and 244 are undefined (i.e., X in FIG. 16A). Also in that case, only the EDC_out_L output signal 260 is valid while the EDC_out_H output signal 258 is undefined. Thus, the EDC_out_L output signal 260 includes the 8-bits error detection code (EDC) used by the mixer 206 when the CPU data width is 8-bits.

Alternatively when the CPU data width is 16-bits, the "Rl" input signal 248 includes the lower byte of the CPU data, the "Rh" input signal 244 includes the high byte of the CPU data, and the "E" input signal 242 is fixed to zero. Also in that case, both of the EDC_out_L output signal 260 and the EDC_out_H output signal 258 are valid. Thus, the EDC_out_L output signal 260 and the EDC_out_H output signal 258 include the 16-bits error detection code (EDC) used by the mixer 206 when the CPU data width is 16-bits.

When the CPU data width is 24-bits, the "Rl" input signal 248 includes the lower byte of the CPU data, the "Rh" input signal 244 includes the middle byte of the CPU data, and the "E" input signal 242 includes the high byte of the CPU data. Also in that case, only the EDC_out_H output signal 258 is valid while the EDC_out_L output signal 260 is undefined. Thus, the EDC_out_H output signal 258 includes the 8-bits error detection code (EDC) used by the mixer 206 when the CPU data width is 24-bits.

The encoder 204 also operates with a 1-bit control signal "Ctrl_16 bits_Access" 246 which may be the "16" CPU data width signal in an example embodiment of the present invention. The encoder 204 also includes a predetermined data register 250, a low-bits coder 252, a high-bits coder 256, and a multiplexer 254. The "Ctrl_16 bits_Access" signal 246 controls the multiplexer 254 to output either an output of the predetermined data register 250 or an output of the low-bits coder 252.

The "Ctrl_16 bits_Access" signal 246 is activated to a logical high state when the CPU generates 16-bits of data for the 16-bits CPU data width. In that case, the multiplexer 254 selects the output of the predetermined data register 250 that is a predetermined bit pattern (such as 0x00 or 0xFF for example) to be input by the high-bits coder 256.

Subsequently, the high-bits coder 256 uses the 8-bits "Rh" input signal 244 to generate the 8-bits "EDC_out_H" output signal 258 while the "E" signal is set to 0 by the CPU 104. Also in that case, the low-bits coder 252 uses the 8-bits "R1" input signal 248 to generate the 8-bits "EDC_out_L" output signal 260. Referring to FIGS. 3 and 5, the total 16-bits of error detection code of the "EDC_out_H" and "EDC_out_L" output signals are available to the mixer 206 when the "Ctrl_16 bits_Access" signal 246 is activated for the 16-bits CPU data width.

The "Ctrl_16 bits_Access" signal 246 is deactivated to a logical low state when the CPU generates 8-bits or 24-bits of data for the 8-bits or 24-bits CPU data width. In both cases, the low-bits coder 252 uses just the "R1" input signal 248 to generate the 8-bits EDC output signal "EDC_out_L" 260, available to the mixer 206 and the multiplexer 254. In both cases, the multiplexer 254 selects the output of the low-bits coder 252 to be input by the high-bits coder 256.

The high-bits coder 256 uses the "Rh" input signal 244, the "E" input signal 242, and the output of the low-bits coder 252 to generate the 8-bits EDC output signal "EDC_out_H" 258 available to the mixer 206. In case of the 8-bits CPU data width, only the "EDC_out_L" output signal 260 is valid and used by the mixer 206 that ignores the "EDC_out_H" output signal 258. In case of the 24-bits CPU data width, only the "EDC_out_H" output signal 258 is valid and used by the mixer 206 that ignores the "EDC_out_L" output signal 260.

Figure 14:
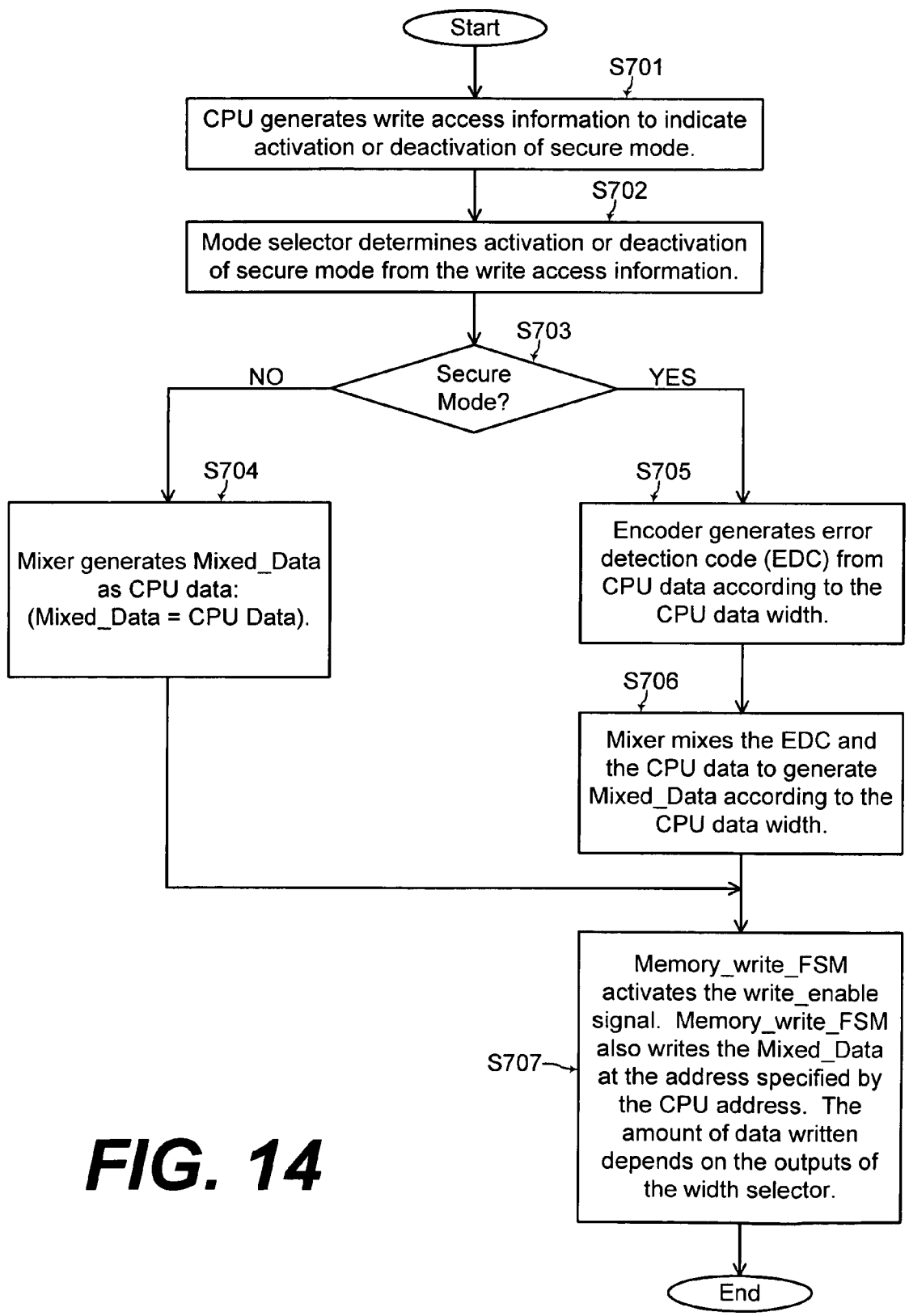
FIG. 14 shows a flowchart of steps during operation of the secure memory interface of FIG. 2 and the writer block of FIG. 3, according to an embodiment of the present invention.

Referring to FIGS. 2 and 3, the secure memory interface 108 and the writer block 114 operate according to the flow-chart of FIG. 14 when the CPU 104 accesses the memory device 102 for a write operation. The CPU 104 generates write memory access information such a write command including a write instruction name, a CPU address indicating an address of the memory device 102 to be accessed, and CPU data to be written to the memory device 102 (step S701 in FIG. 14). The CPU address indicates the location of the memory device 102 for storing the CPU data. The CPU 104 may generate a respective register name storing such CPU data as part of the write memory access information.

Figure 7:
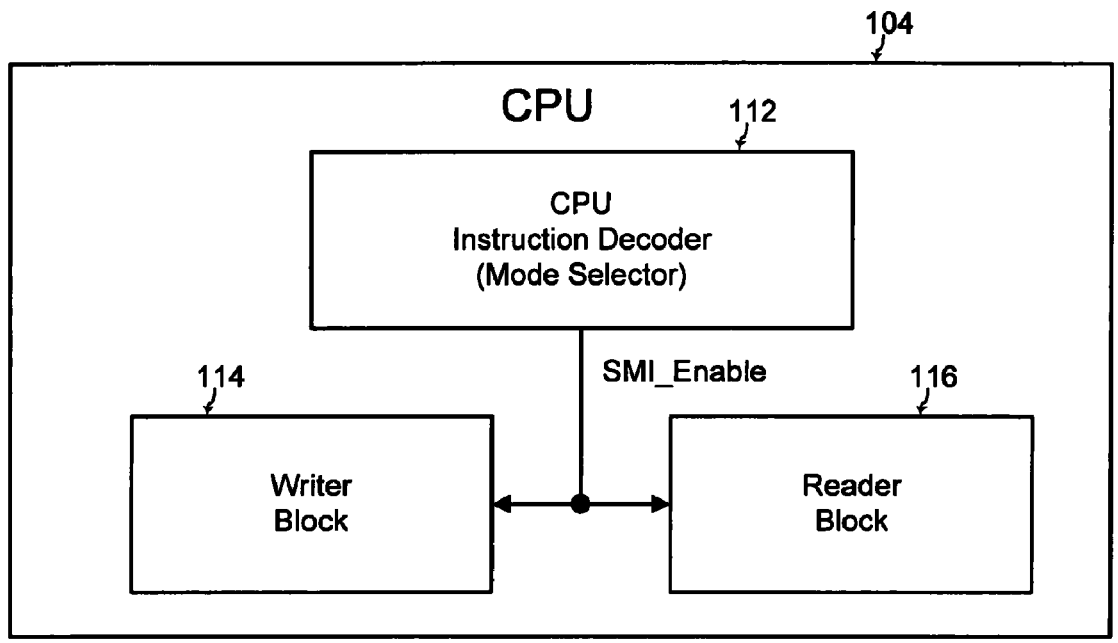
FIG. 7 shows a block diagram of a CPU including an instruction decoder as a mode selector in the writer block and/or the reader block of FIGS. 3 and 6, according to an embodiment of the present invention.

The mode selector 112 determines whether the secure mode is activated by the CPU from the write memory access information (step S702 of FIG. 14). In an example embodiment of the present invention, FIG. 7 shows the mode selector 112 implemented as an instruction name decoder. In that case, the CPU 104 specifies activation or deactivation of the secure mode for the write command with the corresponding instruction name.

For example, the write command includes a regular write instruction name for deactivation of the secure mode and includes a secure write instruction name for activation of the secure mode. In that case, the mode selector 112 in FIG. 7 decodes the instruction name for activating or deactivating the SMI_Enable signal according to the instruction name. For the embodiment of FIG. 7, the CPU is adapted to execute additional instruction sets including for example a regular write instruction, a secure write instruction, a regular read instruction, and a secure read instruction. Each of the regular write and read instruction names results in deactivation of the SMI_Enable signal, and each of the secure write and read instruction names results in activation of the SMI_Enable signal.

Figure 8:
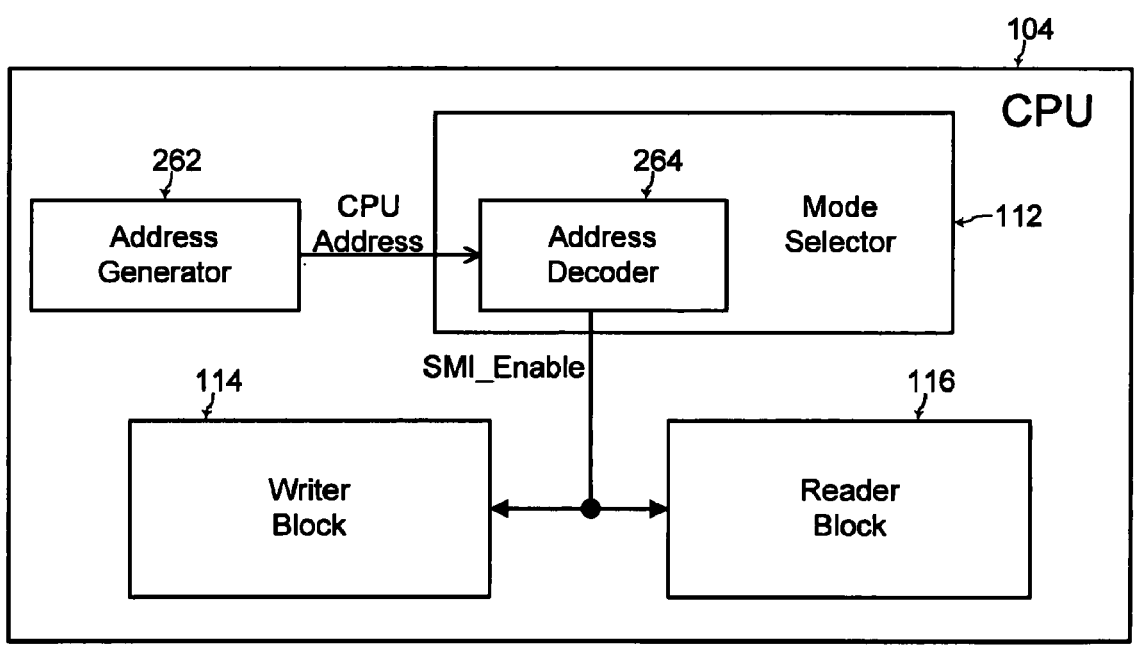
FIG. 8 shows a block diagram of a CPU including an address decoder as a mode selector in the writer block and/or the reader block of FIGS. 3 and 6, according to an embodiment of the present invention.

In another embodiment of the present invention, FIG. 8 shows the mode selector 112 being implemented as an address decoder 264. In that case, the CPU 104 specifies activation or deactivation of the secure mode for the write command with the CPU address generated by an address generator 262 within the CPU 104. As illustrated in an example of FIG. 10, the number of CPU address bits is enough to specify 16 Megabytes of memory capacity. However, the actual total capacity of all memory devices in the electronic system 100 such as in a smart card is significantly less than the addressable memory capacity.

Thus, some bits of the CPU address generated by the CPU 104 may be used for specifying activation or deactivation of the secure mode since such bits are not needed to specify the addresses of the memory device 102. In that case, the address decoder 264 decodes such a CPU address from the address generator 262 to activate or deactivate the SMI_Enable signal for activation or deactivation of the secure mode. For example, the address decoder 264 includes an address filter that determines whether each CPU address from the address generator 262 is a secure address for activation of the secure mode or is a non-secure address for deactivation of the secure mode.

Figure 9:
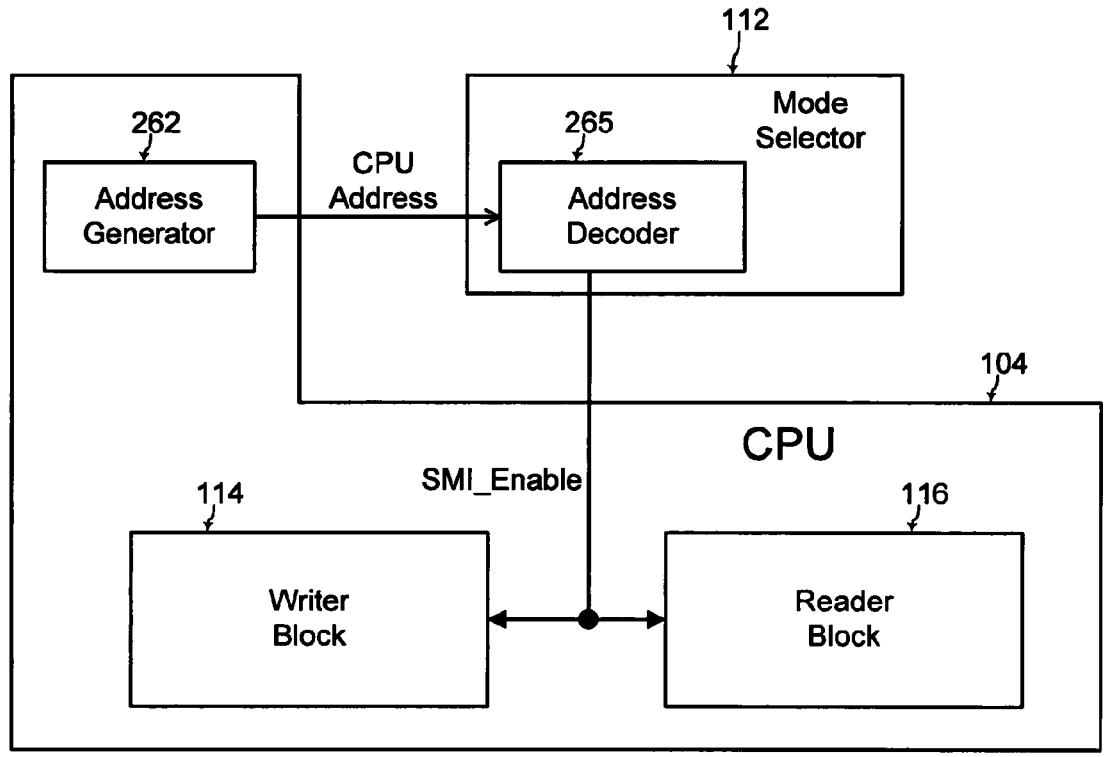
FIG. 9 shows a block diagram that is a modification from FIG. 8 with the mode selector being disposed outside of the CPU, according to an alternative embodiment of the present invention.
Figure 10:
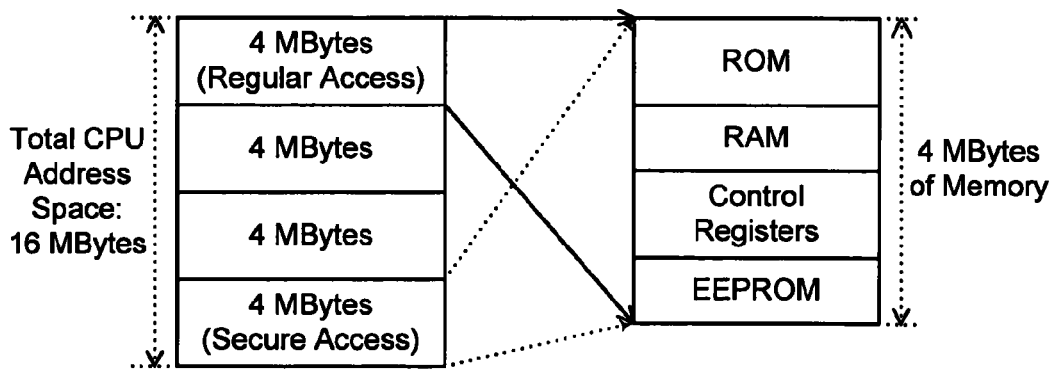
FIG. 10 illustrates use of CPU address bits for indicating activation or deactivation of the secure mode, according to an embodiment of the present invention.

FIG. 9 illustrates an alternative embodiment of the present invention with an address decoder 265 being formed outside of the CPU 104. The address generator 262 of FIG. 9 operates similarly to the address generator 262 of FIG. 8. However, the mode selector 112 with the address decoder 265 is formed outside of the CPU 104 in FIG. 9 to minimize modification of the CPU 104 of the electronic system 100.

Figure 11:
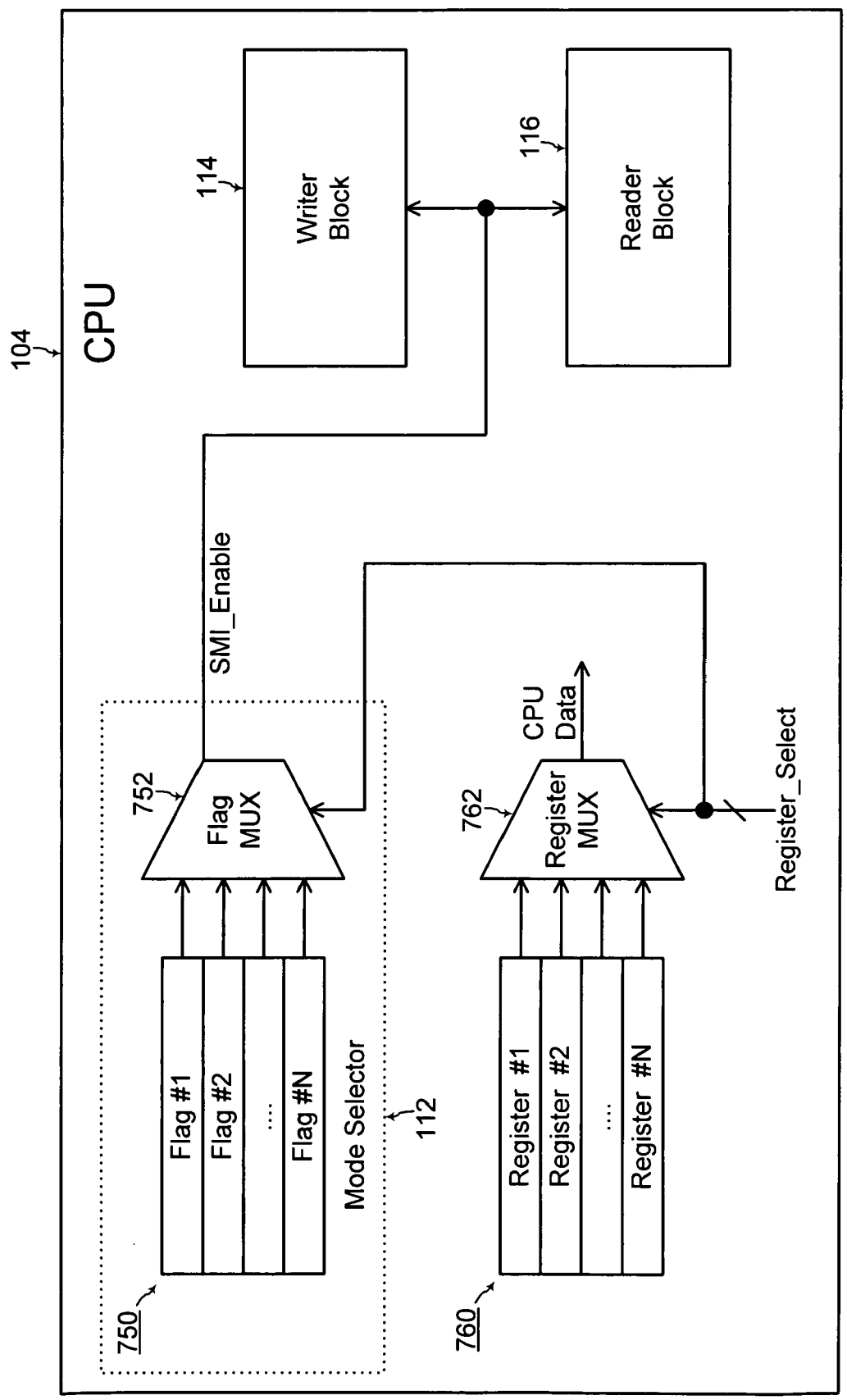
FIG. 11 shows a block diagram of a CPU including a flag register as a mode selector in the writer block and/or the reader block of FIGS. 3 and 6, according to an embodiment of the present invention.

In an alternative embodiment of the present invention, FIG. 11 illustrates the mode selector 112 being implemented with a flag register 750 corresponding to a plurality of data registers 760 of the CPU 104. Each of the plurality of data registers 760 stores respective CPU data to be processed between the CPU 104 and the memory device 102. When generating a write/read command, the CPU 104 specifies a respective identifier of the register (i.e., a corresponding register name) containing the CPU data.

The flag register 750 includes a plurality of register flags with each register flag being set for respective activation or deactivation for a corresponding one of the plurality of registers 760. For example, register flag #1 corresponds to register #1, register flag #2 corresponds to register #2, ..., and so on. The mode selector 112 in FIG. 11 includes a flag multiplexer 752 that outputs a corresponding register flag for one of the registers 760 selected by a register_select signal to output the CPU data through a register multiplexer 762.

In that case, the CPU 104 generates the write/read command including a respective register name corresponding to the CPU data. The register_select signal is generated according to the respective register name for controlling the multiplexers 752 and 762 to output the corresponding one of the register flags 750 and the CPU data from the corresponding one of the registers 760. The selected register flag from the flag multiplexer 752 is the SMI_enable signal.

In the embodiment of FIG. 11, each flag in the flag registers 750 is programmable in the CPU 104. The embodiment of FIG. 11 is especially useful for stack operations of the CPU 104 with the flag register 750 automatically indicating secure or non-secure access to the memory device 102 for each pointer in a stack operation.

FIG. 12 illustrates an alternative embodiment of the present invention with the mode selector 112 having both the address decoder 264 or 265 and the flag register 750. In that case, both the register name and the CPU address in the memory access information generated by the CPU 104 are used for determining activation or deactivation of the secure mode according to the table of FIG. 12.

Referring to a first row 771 in the table of FIG. 12, the flag for the register name indicates deactivation of the secure mode, and the CPU address indicates deactivation of the secure mode. In that case, the SMI_enable signal is deactivated for deactivation of the secure mode. Referring to a second row 772 in the table of FIG. 12, the flag for the register name indicates deactivation of the secure mode, but the CPU address indicates activation of the secure mode. In that case, the SMI_enable signal is activated for activation of the secure mode.

Referring to a third row 773 in the table of FIG. 12, the flag for the register name indicates activation of the secure mode, but the CPU address indicates deactivation of the secure mode. In that case, the SMI_enable signal is activated for activation of the secure mode. Referring to a fourth row 774 in the table of FIG. 12, the flag for the register name indicates activation of the secure mode, and the CPU address indicates activation of the secure mode. In that case, the SMI_enable signal is activated for activation of the secure mode. In this manner in FIG. 12, the SMI_enable signal is activated for activation of the secure mode when at least one of the register name or the CPU address indicates activation of the secure mode.

Examples of memory access information generated by the CPU 104 include a series of read/write commands as follows:

| write_8 | R0 | @0x100 |
| secure_write_16 | A8 | @0x10A |
| read_8 | R1 | @0x102 |
| secure_read_24 | A8 | @0x10A |

The example command "write_8 R0 @0x100" includes the instruction name "write_8" indicating a regular write with deactivation of the secure mode and with a CPU data width of 8-bits. Such a command also includes the register name "R0" having the CPU data to be written into the memory device 102 and includes the CPU address "0x100" for indicating the address of the memory device 102 to be accessed for the write operation.

The example command "secure_write_16 A8 @0x10A" includes the instruction name "secure_write_16" indicating a secure write with activation of the secure mode and with a CPU data width of 16-bits. Such a command also includes the register name "A8" having the CPU data to be written into the memory device 102 and includes the CPU address "0x10A" for indicating the address of the memory device 102 to be accessed for the write operation.

The example command "read_8 R1 @0x102" includes the instruction name "read_8" indicating a regular read with deactivation of the secure mode and with a CPU data width of 8-bits. Such a command also includes the register name "R1" to receive the data read from the memory device 102 and includes the CPU address "0x102" for indicating the address of the memory device 102 to be accessed for the read operation.

The example command "secure_read_24 A8 @0x10A" includes the instruction name "secure_read_24" indicating a secure read with activation of the secure mode and with a CPU data width of 24-bits. Such a command also includes the register name "A8" to receive the data read from the memory device 102 and includes the CPU address "0x10A" for indicating the address of the memory device 102 to be accessed for the read operation.

Referring back to FIGS. 3 and 14, when the secure mode is deactivated as indicated by the SMI_Enable signal (step S703 of FIG. 14), the mixer 206 outputs the mixed data simply as the CPU data (i.e., initial write data) to the memory write FSM 208 (step S704 of FIG. 14). Subsequently, the memory write FSM 208 passes the CPU data (i.e., initial write data) as the memory data and the CPU address as the memory address to the memory device 102 with activation of the write enable signal (step S707 of FIG. 14). Thus, such memory data is written into such memory address of the memory device 102. The amount of memory data written to the memory device 102 depends on the output of the width selector 202 as described above in reference to FIGS. 4 and 13.

Alternatively when the secure mode is activated as indicated by the SMI_Enable signal (step S703 of FIG. 14), the encoder generates the error detection code (EDC) using the CPU data (i.e., initial write data) and/or the corresponding CPU address from the CPU 104. The number of bits of the error detection code (EDC) depends on the CPU data width (step S705 of FIG. 14) as described in reference to FIGS. 5, 16A, and 16B above.

Such error detection code (EDC) is mixed with the CPU data (i.e., initial write data) by the mixer 206 to generate mixed write data (step S706 of FIG. 14) with a number of bits depending on the CPU data width. Subsequently, the memory write FSM 208 generates the memory data (i.e. final write data) and the memory address from such mixed write data (step S707 of FIG. 14). The number of bits of the memory data depends on the memory data width signals "8", "16", and "32" from the width selector 202 as described in reference to FIGS. 4 and 13 above. The memory device 102 receives and stores such memory data into such memory address of the memory device 102. In this manner, the memory data as stored into the memory device 102 when the secure mode is activated incorporates the error detection code (EDC) for a secure write operation in step S707 of FIG. 14.

Figure 6:
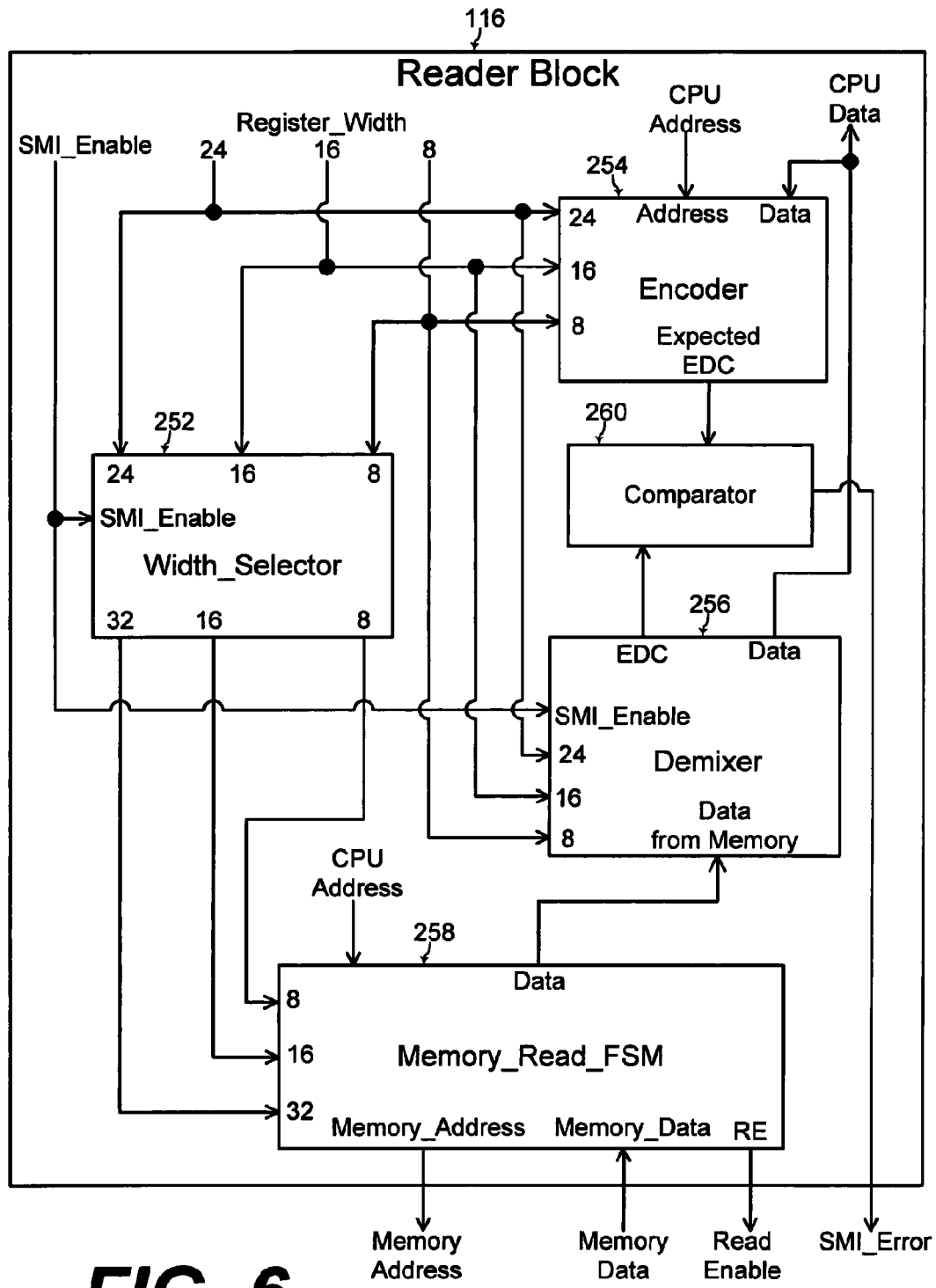
FIG. 6 shows a block diagram of a reader block in the secure memory interface of FIG. 2, according to an embodiment of the present invention.

FIG. 6 shows a block diagram of the reader block 116 of FIG. 2, according to an example embodiment of the present invention. The reader block 116 includes a width selector 252, an encoder 254, a demixer 256, a memory read FSM (finite state machine) 258, and a comparator 260. The width selector 252 and the encoder 254 in the reader block 116 of FIG. 6 is implemented similarly to the width selector 202 and the encoder 204 in the writer block 114 of FIG. 3, according to an example embodiment of the present invention. The demixer 256 in the reader block 116 of FIG. 6 operates in reverse of the mixer 206 in the writer block 114 of FIG. 3 to separate the error detection code from the data.

Figure 15:
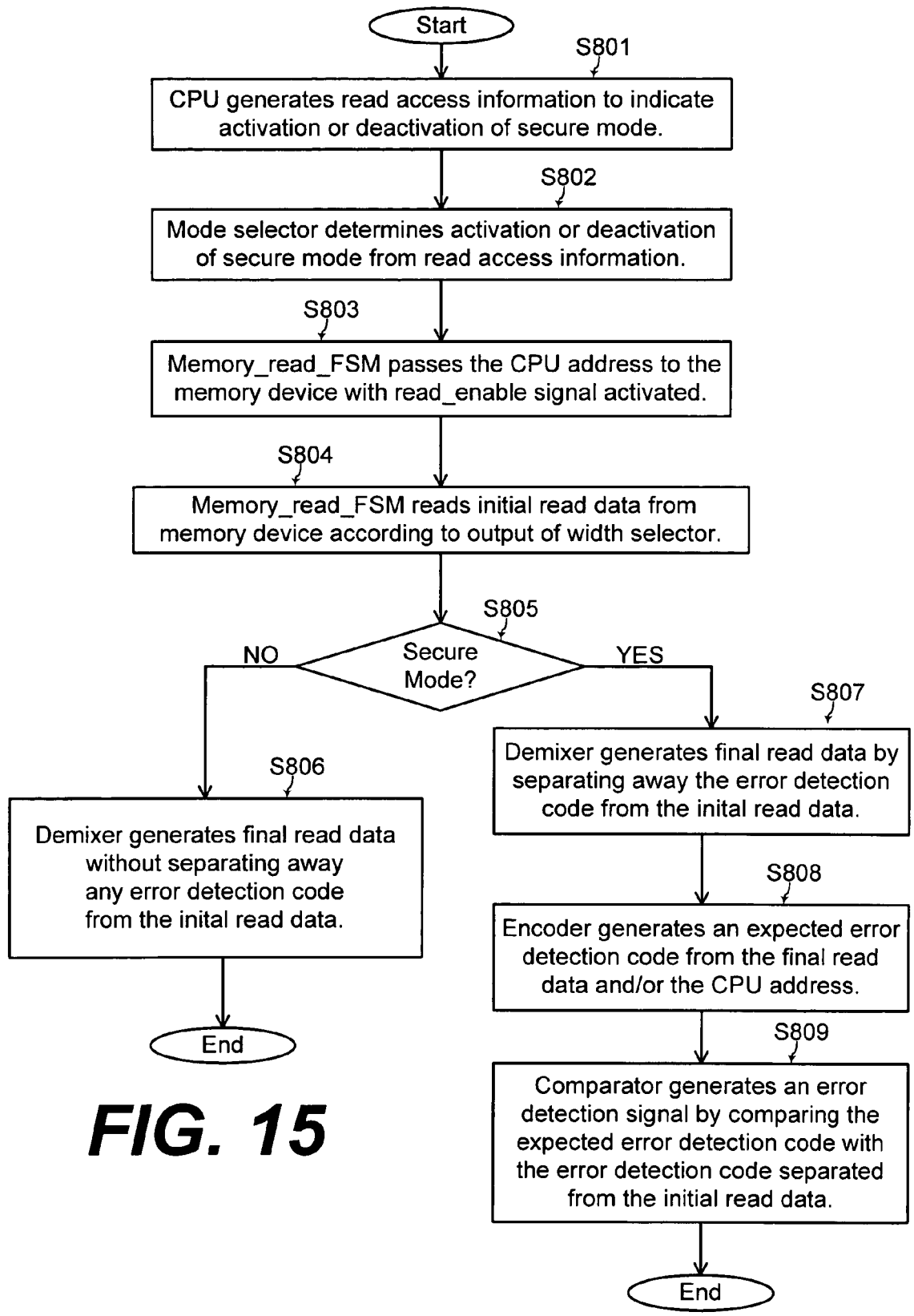
FIG. 15 shows a flowchart of steps during operation of the secure memory interface of FIG. 2 and the reader block of FIG. 6, according to an embodiment of the present invention.

Referring to FIGS. 2 and 6, the secure memory interface 108 and the components 252, 254, 256, 258, and 260 of the reader block 116 further operate according to the flowchart of FIG. 15 when the CPU 104 accesses the memory device 102 for read operation. The CPU 104 generates read memory access information such a read command including a read instruction name and a CPU address indicating an address of the memory device to be accessed (step S801 in FIG. 14). The CPU address indicates the location of the memory device 102 to be read.

The mode selector 112 determines whether the secure mode is activated by the CPU from the read memory access information (step S802 of FIG. 15). The mode selector 112 may be implemented according to any of the example embodiments of FIGS. 7, 8, 9, 10, 11, and 12 as described above.

In addition, the memory read FSM 258 passes the CPU address as the memory address to the memory device 102 with activation of the read enable signal (step S803 of FIG. 15). Subsequently, the memory device 102 transfers the memory data as initial read data from such memory address of the memory device 102 to the memory read FSM 258 (step S804 of FIG. 15). The number of bits of the initial read data depends on the memory data width signals "8", "16", and "32" from the width selector 252 as described in reference to FIGS. 4 and 13 above.

When the secure mode is deactivated as indicated by the SMI_Enable signal (step S805 of FIG. 15), the demixer 256 generates final read data (i.e., the CPU data) from the initial read data without separating away any error detection code from the initial read data (step S806 of FIG. 15). The final read data (i.e., CPU data) is transferred to the CPU 104 with the number of bits of the final read data corresponding to an activated one of the CPU data width signals "8", "16", and "24".

Alternatively when the secure mode is activated as indicated by the SMI_Enable signal (step S805 of FIG. 15), the demixer 256 generates the final read data (i.e., the CPU data) from the initial read data by separating away an error detection code from the initial read data (step S807 of FIG. 15). Subsequently, the encoder 254 generates an expected error detection code (EDC) using at least one of the CPU address and the final read data (step S808 of FIG. 15). Thereafter, the comparator 260 generates an error detection signal (SMI_Error) by comparing such expected EDC from the encoder 254 with the calculated EDC extracted from the initial read data by the demixer 256 (step S809 of FIG. 15).

If the expected EDC from the encoder 254 is not substantially same as the calculated EDC extracted from the initial read data by the demixer 256, the comparator 260 activates the SMI_Error signal to indicate detection of a fault injection into the initial read data received by the memory read FSM 258. The electronic system 100 is notified of such a fault injection into the initial read data.

In one embodiment of the present invention, the writer block 114 and the reader block 116 are each implemented with hardware logic gates in the CPU 104. Such additional hardware logic gates occupy a relatively low silicon area of the CPU 104. Fault injection is detected for such secure data as specified by the CPU 104 using the reader and writer blocks 114 and 116 implemented in hardware in the CPU 104. Thus, increase in silicon area for such reader and writer blocks 114 and 116 is insignificant even for the memory device 102 having high capacity.

In addition, fault injection within the memory device 102 or at the bus 106 between the memory device 102 and the CPU 104 is effectively detected. Furthermore, the CPU 104 may flexibly specify the amount and location of the secure data stored into the memory device 102 irrespective of the capacity of the memory device 102.

The foregoing is by way of example only and is not intended to be limiting. Thus, any number of elements as illustrated and described herein is by way of example only. In addition, the components of the writer block 114 and the reader block 116 may be readily implemented with hardware logic gates given the description of such components herein according to an example embodiment of the present invention. However, the present invention may also be practiced with such components of the writer block 114 and the reader block 116 being implemented with a combination of hardware and/or software.

The present invention is limited only as defined in the following claims and equivalents thereof.

The invention claimed is:

1. A secure memory interface comprising:
    a reader block, comprised of hardware, that generates a final read data to be transferred to a data processing unit by separating away error detection code from initial read data transferred by a memory device when a secure mode is activated; and a mode selector, comprised of hardware, for activating or deactivating the secure mode using memory access information from the data processing unit, wherein the reader block includes a demixer that transfers to the data processing unit the final read data that is generated without separating the error detection code from the initial read data transferred by the memory device when the secure mode is deactivated.

2. The secure memory interface of claim 1, wherein the memory access information includes an instruction name, and wherein the mode selector includes:

an instruction decoder that activates the secure mode when the instruction name is for a secure read instruction, and that deactivates the secure mode when the instruction name is for a regular read instruction.

3. The secure memory interface of claim 2, wherein the reader block and the instruction decoder are disposed in the data processing unit that is a CPU (central processing unit).

4. The secure memory interface of claim 1, wherein the memory access information includes an address of the memory device to be accessed for the initial read data, and wherein the mode selector includes:

an address decoder that activates the secure mode when the address of the memory device to be accessed is a secure address and that deactivates the secure mode when the address of the memory device to be accessed is a non-secure address.

5. The secure memory interface of claim 4, wherein the address decoder is disposed outside of the data processing unit that is a CPU (central processing unit) for generating the address of the memory device to be accessed.

6. The secure memory interface of claim 1, wherein the memory access information includes a register name, and wherein the mode selector includes:

a respective register flag that indicates whether the register name corresponds to activation or deactivation of the secure mode.

7. The secure memory interface of claim 6, wherein the reader block and the respective register flag are disposed in the data processing unit that is a CPU (central processing unit).

8. The secure memory interface of claim 1, wherein the demixer generates the final read data by separating away the error detection code from the initial read data when the secure mode is activated, and generates the final read data from the initial read data without separating the error detection code when the secure mode is deactivated;

and wherein the read block further includes:

an encoder for generating an expected error detection code from at least one of a corresponding address and the final read data; and a comparator for generating an error detection signal by comparing the error detection code separated from the initial read data with the expected error detection code.

9. The secure memory interface of claim 8, wherein the reader block further includes:

a state machine for reading the initial read data from the memory device by generating a memory address and a read enable signal from the memory access information; and a width selector for controlling the state machine to read the initial read data with a memory data width depending on at least one data width control signal that also controls operation of the encoder and the demixer.

10. The secure memory interface of claim 9, wherein the memory data width corresponds to said memory device, and wherein the at least one data width control signal corresponds to a processing data width of the data processing unit.

11. The secure memory interface of claim 10, wherein the data processing unit is a CPU separated from the memory device by a bus.

12. The secure memory interface of claim 11, wherein the data processing unit and the memory device are fabricated as one integrated circuit chip.

13. The secure memory interface of claim 11, wherein the data processing unit and the memory device are fabricated as two separate integrated circuit chips.

14. The secure memory interface of claim 1, further comprising:

a writer block that generates a final write data to be written to the memory device from initial write data and error detection code when the secure mode is activated;

wherein the writer block generates the final write data from the initial write data without the error detection code when the secure mode is deactivated.

15. The secure memory interface of claim 14, wherein the writer block and the reader block are implemented with hardware logic gates.

16. A method of securely accessing a memory device, the method comprising:

generating a final read data to be transferred to a data processing unit by separating away error detection code from initial read data transferred by the memory device when a secure mode is activated; and activating or deactivating the secure mode using memory access information from the data processing unit; and transferring to the data processing unit the final read data that is generated without separating the error detection code from the initial read data transferred by the memory device when the secure mode is deactivated.

17. The method of claim 16, wherein the memory access information includes an instruction name, and wherein the method further includes:

activating the secure mode when the instruction name is for a secure read instruction; and deactivating the secure mode when the instruction name is for a regular read instruction.

18. The method of claim 16, wherein the memory access information includes an address of the memory device to be accessed for the initial read data, and wherein the method further includes:

activating the secure mode when the address of the memory device to be accessed is a secure address; and deactivating the secure mode when the address of the memory device to be accessed is a non-secure address.

19. The method of claim 16, wherein the memory access information includes a register name, and wherein a respective register flag indicates whether the register name corresponds to activation or deactivation of the secure mode.

20. The method of claim 16, further comprising:

generating an expected error detection code from at least one of a corresponding address and the final read data; and generating an error detection signal by comparing the error detection code separated from the initial read data with the expected error detection code.

21. The method of claim 20, further comprising:

reading the initial read data from the memory device by generating a memory address and a read enable signal from the memory access information; and controlling a state machine to read the initial read data with a memory data width depending on at least one data width control signal, wherein the at least one data width control signal corresponds to a processing data width of the data processing unit.

22. The method of claim 21, wherein the data processing unit is a CPU separated from the memory device by a bus.

23. The method of claim 22, wherein the data processing unit and the memory device are fabricated as one integrated circuit chip.

24. The method of claim 22, wherein the data processing unit and the memory device are fabricated as two separate integrated circuit chips.

25. The method of claim 16, further comprising:
generating a final write data to be written to the memory device from initial write data and error detection code when the secure mode is activated; and
generating the final write data from the initial write data without the error detection code when the secure mode is deactivated.

\* \* \* \* \*